US012809011B2

(12) United States Patent
Shin

(10) Patent No.: US 12,809,011 B2
(45) Date of Patent: Nov. 24, 2026

(54) MULTI-DEVICE ARBITRATION USING PAIRWISE RANGE MULTILATERATION BETWEEN EARBUDS AND TARGET DEVICE

(71) Applicant: GOOGLE LLC, Mountain View, CA (US)

(72) Inventor: Dongeek Shin, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 290 days.

(21) Appl. No.: 18/440,402

(22) Filed: Feb. 13, 2024

(65) Prior Publication Data

US 2025/0216535 A1 Jul. 3, 2025

Related U.S. Application Data

(60) Provisional application No. 63/615,928, filed on Dec. 29, 2023.

(51) Int. Cl.
*G01S 13/08* (2006.01)
*G01S 13/02* (2006.01)
*G10L 15/22* (2006.01)

(52) U.S. Cl.
CPC .......... *G01S 13/08* (2013.01); *G01S 13/0209* (2013.01); *G10L 15/22* (2013.01)

(58) Field of Classification Search
CPC .... G01S 13/08; G01S 13/0209; G01S 13/765; G01S 13/878; G10L 15/22
See application file for complete search history.

(56) References Cited

U.S. PATENT DOCUMENTS

2022/0189470 A1 6/2022 Sharifi et al.
2022/0286603 A1 9/2022 Lv et al.

FOREIGN PATENT DOCUMENTS

EP 4171135 4/2023
EP 4171135 A1 * 4/2023 .......... H04W 64/006
WO 2022170863 8/2022

(Continued)

OTHER PUBLICATIONS

Machine translation of WO 2022/193884 A1 (Year: 2022).*

(Continued)

*Primary Examiner* — Resha Desai
*Assistant Examiner* — Naomi M Wolford
(74) *Attorney, Agent, or Firm* — Gray Ice Higdon

(57) ABSTRACT

Techniques are described herein for multi-device arbitration using pairwise range multilateration between earbuds and a target device. A method includes: transmitting, by a first user-worn device, to a candidate device, a first impulse signal; receiving, by the first user-worn device, from the candidate device, a second impulse signal; determining a physical distance based on an elapsed time between transmitting the first impulse signal and receiving the second impulse signal; transmitting, by a second user-worn device, to the candidate device, a third impulse signal; receiving, by the second user-worn device, from the candidate device, a fourth impulse signal; determining a physical distance based on an elapsed time between transmitting the third impulse signal and receiving the fourth impulse signal; and determining, based on the physical distances, that the candidate device is a query target.

15 Claims, 6 Drawing Sheets

(56) References Cited

FOREIGN PATENT DOCUMENTS

| | | | | |
|---|---|---|---|---|
| WO | 2022178156 | | 8/2022 | |
| WO | 2022193884 | | 9/2022 | |
| WO | WO-2022193884 A1 | * | 9/2022 | ........... H04L 12/282 |

OTHER PUBLICATIONS

European Patent Office; International Search Report and Written Opinion issued in Application No. PCT/US2024/062117; 11 pages; dated Apr. 11, 2025.

* cited by examiner

MULTI-DEVICE ARBITRATION USING PAIRWISE RANGE MULTILATERATION BETWEEN EARBUDS AND TARGET DEVICE

BACKGROUND

Humans can engage in human-to-computer dialogs with interactive software applications referred to herein as "automated assistants" (also referred to as "digital agents," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, by providing textual (e.g., typed) natural language input, and/or through touch and/or utterance free physical movement(s) (e.g., hand gesture(s), eye gaze, facial movement, etc.). An automated assistant responds to a request by providing responsive user interface output (e.g., audible and/or visual user interface output), controlling one or more smart devices, and/or controlling one or more function(s) of a device implementing the automated assistant (e.g., controlling other application(s) of the device).

As mentioned above, many automated assistants are configured to be interacted with via spoken utterances. To preserve user privacy and/or to conserve resources, automated assistants refrain from performing one or more automated assistant functions based on all spoken utterances that are present in audio data detected via microphone(s) of a client device that implements (at least in part) the automated assistant. Rather, certain processing based on spoken utterances occurs only in response to determining certain condition(s) are present.

For example, many client devices, that include and/or interface with an automated assistant, include a hotword detection model. When microphone(s) of such a client device are not deactivated, the client device can continuously process audio data detected via the microphone(s), using the hotword detection model, to generate predicted output that indicates whether one or more hotwords (inclusive of multi-word phrases) are present, such as "Hey Assistant", "OK Assistant", and/or "Assistant". When the predicted output indicates that a hotword is present, any audio data that follows within a threshold amount of time (and optionally that is determined to include voice activity) can be processed by one or more on-device and/or remote automated assistant components such as speech recognition component(s), voice activity detection component(s), etc. Further, recognized text (from the speech recognition component(s)) can be processed using natural language understanding engine(s) and/or action(s) can be performed based on the natural language understanding engine output. The action(s) can include, for example, generating and providing a response and/or controlling one or more application(s) and/or smart device(s)). However, when the predicted output indicates that a hotword is not present, corresponding audio data will be discarded without any further processing, thereby conserving resources and user privacy.

An environment (e.g., a room, home, office, etc.) may include two or more client devices capable of far-field speech recognition, each executing an automated assistant. In such an environment, two or more automated assistants may be triggered (i.e., activated) in response to a spoken utterance of a user that includes a hotword. This activation of two or more automated assistants in response to the spoken utterance may be undesirable as it may not have been intended by the user and may result in unnecessary utilization of processing and/or power (e.g., battery) resources, etc.

SUMMARY

Some implementations disclosed herein are directed to multi-device arbitration using pairwise range multilateration between earbuds and a target device. As described in more detail herein, ultra-wideband (UWB) antennas on each earbud in a pair of earbuds may be used to perform a two-range multilateration on a target device that is also equipped with UWB. Based on a spherical threshold on the multilateration result, the target device may be localized down to sub-meter accuracy, and thus multi-device arbitration may be accurately performed. In some implementations, by identifying a target device using pairwise range multilateration, unintended activations of automated assistants may be minimized, and excess consumption of processing and/or power (e.g., battery) resources may be reduced or avoided. Additionally, in some implementations, the target device, once identified, may perform automated speech recognition on an input audio signal, prior to identifying a hotword in the input audio signal.

In various implementations, a method implemented by one or more processors may include: transmitting, by an ultra-wideband transceiver on a first user-worn device, to an ultra-wideband transceiver on a candidate device, a first impulse signal; receiving, by the ultra-wideband transceiver on the first user-worn device, from the ultra-wideband transceiver on the candidate device, a second impulse signal, the second impulse signal being sent as a response to the first impulse signal; determining a physical distance between the first user-worn device and the candidate device based on an elapsed time between transmitting the first impulse signal and receiving the second impulse signal; transmitting, by an ultra-wideband transceiver on a second user-worn device, to the ultra-wideband transceiver on the candidate device, a third impulse signal; receiving, by the ultra-wideband transceiver on the second user-worn device, from the ultra-wideband transceiver on the candidate device, a fourth impulse signal, the fourth impulse signal being sent as a response to the third impulse signal; determining a physical distance between the second user-worn device and the candidate device based on an elapsed time between transmitting the third impulse signal and receiving the fourth impulse signal; and determining, based on (i) the physical distance between the first user-worn device and the candidate device and (ii) the physical distance between the second user-worn device and the candidate device, that the candidate device is a query target.

In some implementations, determining that the candidate device is the query target may include: determining a first absolute value, the first absolute value being an absolute value of a difference between (i) the physical distance between the first user-worn device and the candidate device and (ii) the physical distance between the second user-worn device and the candidate device; and determining that the first absolute value satisfies a first threshold. In some implementations, determining that the candidate device is the query target may further include: determining a second absolute value, the second absolute value being an absolute value of a difference between a ground truth device distance and an average of (i) the physical distance between the first user-worn device and the candidate device and (ii) the physical distance between the second user-worn device and the candidate device; and determining that the second absolute value satisfies a second threshold.

In some implementations, the first user-worn device is a first earbud, and the second user-worn device is a second earbud. In some implementations, determining the physical distance between the first user-worn device and the candidate device is further based on a predetermined time in which the candidate device prepares the response to the first impulse signal; and determining the physical distance between the second user-worn device and the candidate device is further based on a predetermined time in which the candidate device prepares the response to the second impulse signal.

In some implementations, the method may further include, in response to determining that the candidate device is the query target, causing the candidate device to activate an automated assistant function. In some implementations, the method may further include causing the candidate device to perform automated speech recognition on an input audio signal, prior to identifying a hotword in the input audio signal.

In some additional or alternative implementations, a computer program product may include one or more computer-readable storage media having program instructions collectively stored on the one or more computer-readable storage media. The program instructions may be executable to: transmit, by an ultra-wideband transceiver on a first user-worn device, to an ultra-wideband transceiver on a candidate device, a first impulse signal; receive, by the ultra-wideband transceiver on the first user-worn device, from the ultra-wideband transceiver on the candidate device, a second impulse signal, the second impulse signal being sent as a response to the first impulse signal; determine a physical distance between the first user-worn device and the candidate device based on an elapsed time between transmitting the first impulse signal and receiving the second impulse signal; transmit, by an ultra-wideband transceiver on a second user-worn device, to the ultra-wideband transceiver on the candidate device, a third impulse signal; receive, by the ultra-wideband transceiver on the second user-worn device, from the ultra-wideband transceiver on the candidate device, a fourth impulse signal, the fourth impulse signal being sent as a response to the third impulse signal; determine a physical distance between the second user-worn device and the candidate device based on an elapsed time between transmitting the third impulse signal and receiving the fourth impulse signal; and determine, based on (i) the physical distance between the first user-worn device and the candidate device and (ii) the physical distance between the second user-worn device and the candidate device, that the candidate device is a query target.

In some additional or alternative implementations, a system may include a processor, a computer-readable memory, one or more computer-readable storage media, and program instructions collectively stored on the one or more computer-readable storage media. The program instructions may be executable to: transmit, by an ultra-wideband transceiver on a first user-worn device, to an ultra-wideband transceiver on a candidate device, a first impulse signal; receive, by the ultra-wideband transceiver on the first user-worn device, from the ultra-wideband transceiver on the candidate device, a second impulse signal, the second impulse signal being sent as a response to the first impulse signal; determine a physical distance between the first user-worn device and the candidate device based on an elapsed time between transmitting the first impulse signal and receiving the second impulse signal; transmit, by an ultra-wideband transceiver on a second user-worn device, to the ultra-wideband transceiver on the candidate device, a third impulse signal; receive, by the ultra-wideband transceiver on the second user-worn device, from the ultra-wideband transceiver on the candidate device, a fourth impulse signal, the fourth impulse signal being sent as a response to the third impulse signal; determine a physical distance between the second user-worn device and the candidate device based on an elapsed time between transmitting the third impulse signal and receiving the fourth impulse signal; and determine, based on (i) the physical distance between the first user-worn device and the candidate device and (ii) the physical distance between the second user-worn device and the candidate device, that the candidate device is a query target.

The above description is provided as an overview of some implementations of the present disclosure. Further description of those implementations, and other implementations, are described in more detail below.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include an automated assistant client device (e.g., a client device including at least an automated assistant interface for interfacing with cloud-based automated assistant component(s)) that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

DETAILED DESCRIPTION

Figure 1:
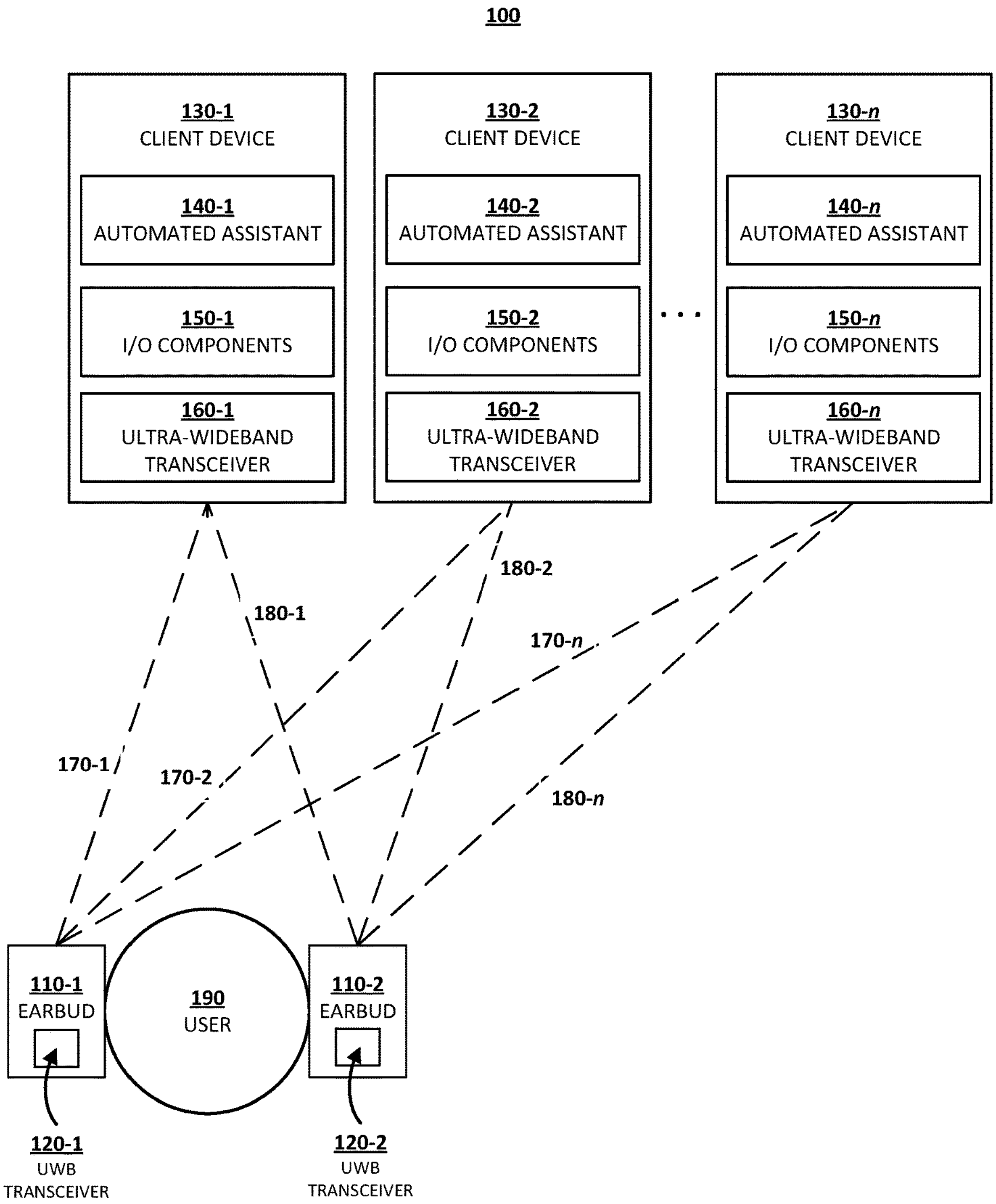
FIG. 1 schematically depicts an example environment in which selected aspects of the present disclosure may be implemented, in accordance with various implementations.

FIG. 1 schematically depicts an example environment 100 in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth. Some of the systems depicted in FIG. 1 may be implemented (in whole or in part) using one or more server computing devices that form what is sometimes referred to as a "cloud infrastructure," although this is not required.

In implementations, the environment 100 may include a pair of wireless earbuds 110-1, 110-2 that are worn by a user 190. In some implementations, the wireless earbuds 110-1, 110-2 can gently reside in a right ear (in the case of wireless earbud 110-2) and a left ear (in the case of wireless earbud 110-1) of the user 190 for listening to audio generated at an application of another computing device. Wireless earbud 110-1 may include an ultra-wideband transceiver 120-1, and wireless earbud 110-2 may include an ultra-wideband transceiver 120-2. The ultra-wideband transceivers 120-1, 120-2 may include an ultra-wideband chipset and a single antenna capable of ranging against a target ultra-wideband chipset. Additional and/or alternative headphone devices (e.g., on-ear or over-the-ear headphones) may be provided instead of the wireless earbuds 110-1, 110-2.

In other implementations, other wearable devices (e.g., non-headphone devices) may be provided instead of wireless earbuds 110-1, 110-2, and an ultra-wideband transceiver 120-1 may be located on a portion of the wearable device that is worn on a first side of a user's body, and an ultra-wideband transceiver 120-2 may be located on a portion of the wearable device that is worn on a second side of a user's body. For example, a pair of smart glasses (not shown) may be provided instead of wireless earbuds 110-1, 110-2, and the pair of smart glasses may include an ultra-wideband transceiver 120-1 located at the left temple of the smart glasses (e.g., worn on the left side of the user 190), and an ultra-wideband transceiver 120-2 located at the right temple of the smart glasses (e.g., worn on the right side of the user 190).

In implementations, the environment 100 may also include one or more client device(s) 130-1, 130-2, . . . 130-*n*. The one or more client device(s) 130-1, 130-2, . . . 130-*n* may include one or more smart devices, such as a standalone assistant-centric interactive speaker, a standalone assistant-centric interactive display with speaker(s), a smart appliance such as a smart television, and/or a wearable apparatus of a user that includes a computing device (e.g., a watch of the user having a computing device, etc.). The one or more client device(s) 130-1, 130-2, . . . 130-*n* may also include any other computing devices, such as one or more smartphones, desktop computing devices, laptop computing devices, and/or tablet computing devices, etc. Additional and/or alternative client device(s) 130-1, 130-2, . . . 130-*n* may be provided.

The one or more client device(s) 130-1, 130-2, . . . 130-*n* may include an instance of an automated assistant 140-1, 140-2, . . . , 140-*n*. The automated assistant 140-1, 140-2, . . . , 140-*n* can process user inputs received from input device(s) of I/O components 150-1, 150-2, . . . , 150-*n*, such as spoken inputs detected via microphone(s) of I/O components 150-1, 150-2, . . . , 150-*n*, touch inputs received via touch-screen displays of I/O components 150-1, 150-2, . . . , 150-*n*, images detected via camera(s) of I/O components 150-1, 150-2, . . . , 150-*n*, etc. Further, the automated assistant 140-1, 140-2, . . . , 140-*n* can optionally render various outputs via output device(s) of I/O components 150-1, 150-2, . . . , 150-*n*, such as speaker(s) and/or touch-screen displays of I/O components 150-1, 150-2, . . . , 150-*n*. The one or more client device(s) 130-1, 130-2, . . . 130-*n* may also include ultra-wideband transceivers 160-1, 160-2, . . . , 160-*n*. The ultra-wideband transceivers 160-1, 160-2, . . . , 160-*n* may include an ultra-wideband chipset and a single antenna capable of ranging against a target ultra-wideband chipset.

In some implementations, the ultra-wideband transceiver 120-1 of the wireless earbud 110-1 may perform ranging against the ultra-wideband transceiver 160-1, 160-2, . . . , 160-*n* of a particular client device 130-1, 130-2, . . . 130-*n*, determining a distance between the wireless earbud 110-1 and the particular client device 130-1, 130-2, . . . 130-*n*. For example, the ultra-wideband transceiver 120-1 of the wireless earbud 110-1 may perform ranging against the ultra-wideband transceiver 160-1 of the client device 130-1, determining a distance 170-1 between the wireless earbud 110-1 and the client device 130-1. The ultra-wideband transceiver 120-1 of the wireless earbud 110-1 may also perform ranging against the ultra-wideband transceiver 160-2 of the client device 130-2, determining a distance 170-2 between the wireless earbud 110-1 and the client device 130-2. The ultra-wideband transceiver 120-1 of the wireless earbud 110-1 may also perform ranging against the ultra-wideband transceiver 160-*n* of the client device 130-*n*, determining a distance 170-*n* between the wireless earbud 110-1 and the client device 130-*n*.

The ultra-wideband transceiver 120-2 of wireless earbud 110-2 may also perform ranging against the ultra-wideband transceiver 160-1, 160-2, . . . , 160-*n* of one of the client devices 130-1, 130-2, . . . 130-*n*, determining a distance between the wireless earbud 110-2 and the particular client device 130-1, 130-2, . . . 130-*n*. For example, the ultra-wideband transceiver 120-2 of the wireless earbud 110-2 may perform ranging against the ultra-wideband transceiver 160-1 of the client device 130-1, determining a distance 180-1 between the wireless earbud 110-2 and the client device 130-1. The ultra-wideband transceiver 120-2 of the wireless earbud 110-2 may also perform ranging against the ultra-wideband transceiver 160-2 of the client device 130-2, determining a distance 180-2 between the wireless earbud 110-2 and the client device 130-2. The ultra-wideband transceiver 120-2 of the wireless earbud 110-2 may also perform ranging against the ultra-wideband transceiver 160-*n* of the client device 130-*n*, determining a distance 180-*n* between the wireless earbud 110-2 and the client device 130-*n*.

Figure 2:
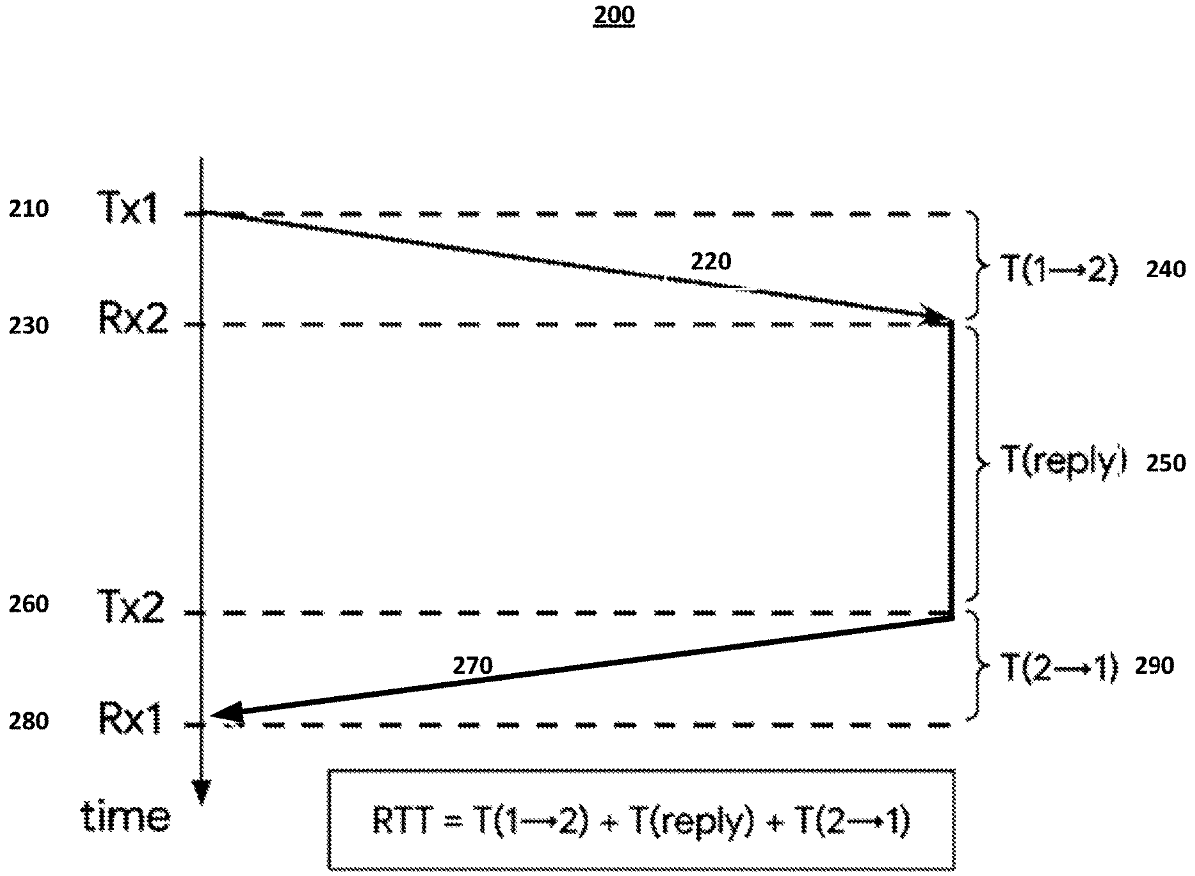
FIG. 2 depicts an ultra-wideband ranging session between two ultra-wideband transceivers, in accordance with various implementations.

FIG. 2 depicts an ultra-wideband ranging session 200 between two ultra-wideband transceivers. At time Tx1 210, a first ultra-wideband transceiver (e.g., the ultra-wideband transceiver 120-1 of the wireless earbud 110-1 or the ultra-wideband transceiver 120-2 of the wireless earbud 110-2) sends a first impulse signal 220 to a second ultra-wideband transceiver (e.g., the ultra-wideband transceiver 160-1, 160-2, . . . , 160-*n* of a particular client device 130-1, 130-2, . . . 130-*n*). The first impulse signal 220 is received by the second ultra-wideband transceiver at time Rx2 230. The elapsed time between Tx1 210 and Rx2 230 is T (1→2) 240.

The second ultra-wideband transceiver understands a template a priori for decoding the first impulse signal 220. The second ultra-wideband transceiver prepares a reply to the first impulse signal 220 in a fixed time, T (reply) 250. At time Tx2 260, the second ultra-wideband transceiver sends a second impulse signal 270 to the first ultra-wideband transceiver. The second impulse signal 270 is received by the first ultra-wideband transceiver at time Rx1 280. The elapsed time between Tx2 260 and Rx1 280 is T (2→1) 290.

The first ultra-wideband transceiver then computes the distance d between the first ultra-wideband transceiver and the second ultra-wideband transceiver, based on the roundtrip time RTT, which is the sum of T (1→2) 240, T (reply) 250, and T (2→1) 290. In particular, the first ultra-wideband transceiver may compute distance d using the equation $$d = \frac{c \times (RTT - T(\text{reply}))}{2}$$

where c is the speed of light.

In the example environment 100 of FIG. 1, by performing the ultra-wideband ranging session 200 shown in FIG. 2, the ultra-wideband transceiver 120-1 of left earbud 110-1 determines the distance 170-1 between left earbud 110-1 and client device 130-1, and the ultra-wideband transceiver 120-2 of right earbud 110-2 determines the distance 180-1 between right earbud 110-2 and client device 130-1. The client device 130-1 is determined to be a target device for querying based on an absolute value of the difference between the distance 170-1 and the distance 180-1 satisfying a first threshold. In other words, based on the distance 170-1 and the distance 180-1 being approximately equal, a determination is made that the user 190 is facing the client device 130-1, and therefore the client device 130-1 is determined to be the target device for querying.

In some implementations, a second absolute value of a difference between a ground truth device distance and an average of the distance 170-1 and the distance 180-1 may be determined, and the client device 130-1 is determined to be the target device further based on the second absolute value satisfying a second threshold. In some implementations, the ground truth device distance may be calibrated before run-time (e.g., during setup of the client device 130-1).

In the example environment 100 of FIG. 1, because the user 190 is not facing client device 130-2, the distance 170-2 may be longer than the distance 180-2, and therefore an absolute value of the difference between the distance 170-2 and the distance 180-2 may not satisfy the first threshold. Additionally, because the user 190 is not facing client device **130-*n*, the distance 170-*n* may be longer than the distance 180-*n*, and therefore an absolute value of the difference between the distance 170-*n* and the distance 180-*n* may not satisfy the first threshold. Accordingly, client devices 130-2, 130-*n*** are not determined to be the target device for querying.

In some implementations, based on the client device 130-1 being determined to be the target device for querying, an automated assistant function of the client device 130-1 may be activated. For example, the client device 130-1 may be caused to perform automated speech recognition on an input audio signal, prior to identifying a hotword in the input audio signal. In some implementations, activation of an automated assistant function of the client devices 130-2, **130-*n* may be suppressed, based on the client device 130-1 being determined to be the target device for querying. In this way, unintended activations of automated assistants running on the client devices 130-2, 130-*n*** may be avoided.

In some implementations, the ultra-wideband transceivers 120-1, 120-2 of the wireless earbuds 110-1, 110-2 may perform ranging against the ultra-wideband transceivers 160-1, 160-2, . . . , **160-*n* of each of the client devices 130-1, 130-2, . . . 130-*n* in the environment 100 at a high inference rate (e.g., 30 Hz) in query time with an always-on ultra-wideband chipset. Accordingly, a target device for querying may be rapidly updated as the user 190 turns to face a new one of the client devices 130-1, 130-2, . . . 130-*n* in the environment 100**.

In some implementations, ultra-wideband ranging may be initiated by the wireless earbuds 110-1, 110-2 or a computing device (e.g., a smartphone) to which the wireless earbuds 110-1, 110-2 are connected. In other implementations, ultra-wideband ranging may be initiated by one or more of the client devices 130-1, 130-2, . . . **130-*n* in the environment 100**.

Figure 3:
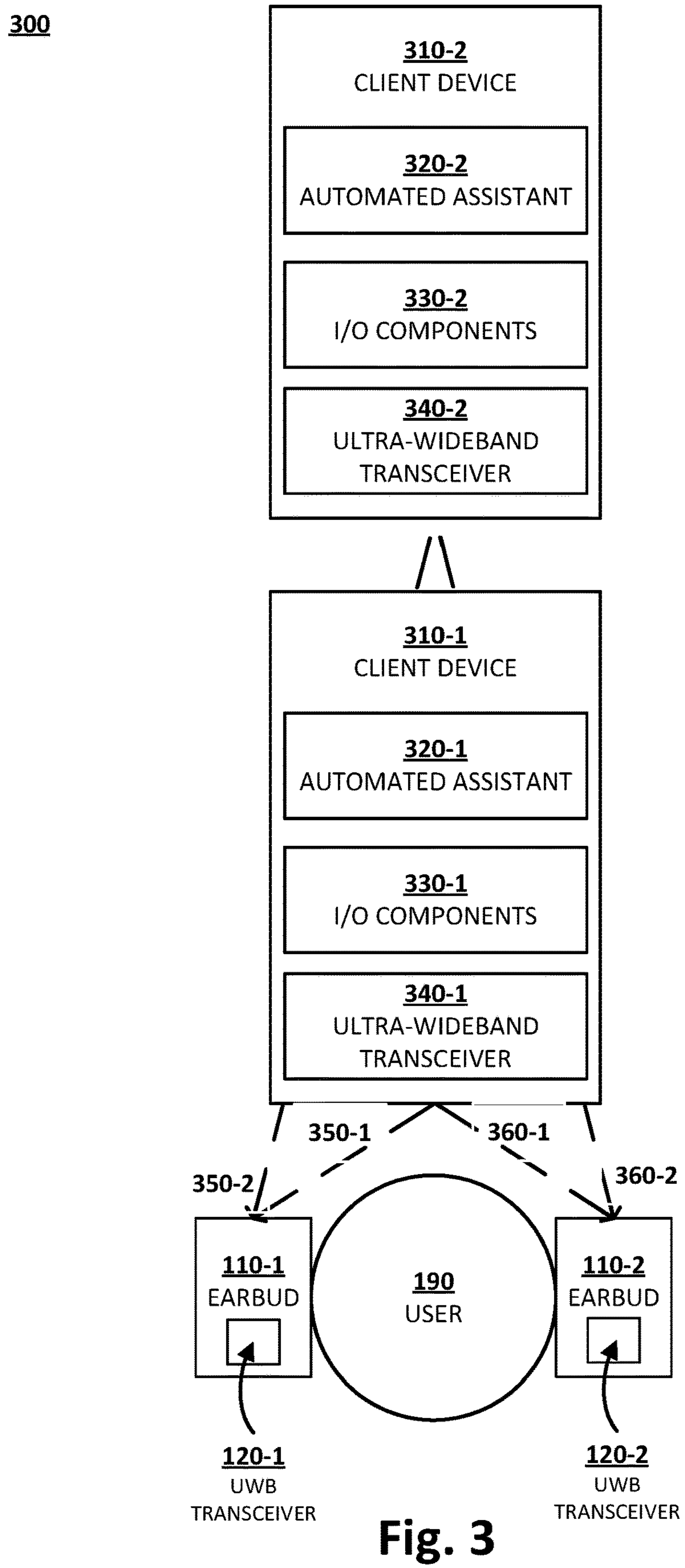
FIG. 3 schematically depicts another example environment in which selected aspects of the present disclosure may be implemented, in accordance with various implementations.

FIG. 3 schematically depicts another example environment 300 in which selected aspects of the present disclosure may be implemented, in accordance with various implementations. In implementations, the environment 300 may include a pair of wireless earbuds 110-1, 110-2 that are worn by a user 190. Wireless earbud 110-1 may include an ultra-wideband transceiver 120-1, and wireless earbud 110-2 may include an ultra-wideband transceiver 120-2.

In implementations, the environment 300 may also include client devices 310-1, 310-2. The client devices 310-1, 310-2 may include one or more smart devices, such as a standalone assistant-centric interactive speaker, a standalone assistant-centric interactive display with speaker(s), a smart appliance such as a smart television, and/or a wearable apparatus of a user that includes a computing device (e.g., a watch of the user having a computing device, etc.). The client devices 310-1, 310-2 may also include any other computing devices, such as one or more smartphones, desktop computing devices, laptop computing devices, and/or tablet computing devices, etc. Additional and/or alternative client device(s) client devices 310-1, 310-2 may be provided.

The client devices 310-1, 310-2 may include an instance of an automated assistant 320-1, 320-2. The automated assistant 320-1, 320-2 can process user inputs received from input device(s) of I/O components 330-1, 330-2, such as spoken inputs detected via microphone(s) of I/O components 330-1, 330-2, touch inputs received via touch-screen displays of I/O components 330-1, 330-2, images detected via camera(s) of I/O components 330-1, 330-2, etc. Further, the automated assistant 320-1, 320-2 can optionally render various outputs via output device(s) of I/O components 330-1, 330-2, such as speaker(s) and/or touch-screen displays of I/O components 330-1, 330-2. The client devices 310-1, 310-2 may also include ultra-wideband transceivers 340-1, 340-2. The ultra-wideband transceivers 340-1, 340-2 may include an ultra-wideband chipset and a single antenna capable of ranging against a target ultra-wideband chipset.

In some implementations, the ultra-wideband transceiver 120-1 of the wireless earbud 110-1 may perform ranging against the ultra-wideband transceiver 340-1, 340-2 of a particular client device 310-1, 310-2, determining a distance between the wireless earbud 110-1 and the particular client device 310-1, 310-2. For example, the ultra-wideband transceiver 120-1 of the wireless earbud 110-1 may perform ranging against the ultra-wideband transceiver 340-1 of the client device 310-1, determining a distance 350-1 between the wireless earbud 110-1 and the client device 310-1. The ultra-wideband transceiver 120-1 of the wireless earbud 110-1 may also perform ranging against the ultra-wideband transceiver 340-2 of the client device 310-2, determining a distance 350-2 between the wireless earbud 110-1 and the client device 310-2.

The ultra-wideband transceiver 120-2 of wireless earbud 110-2 may also perform ranging against the ultra-wideband transceiver 340-1, 340-2 of a particular client device 310-1, 310-2, determining a distance between the wireless earbud 110-2 and the particular client device 310-1, 310-2. For example, the ultra-wideband transceiver 120-2 of the wireless earbud 110-2 may perform ranging against the ultra-wideband transceiver 340-1 of the client device 310-1, determining a distance 360-1 between the wireless earbud 110-2 and the client device 310-1. The ultra-wideband transceiver 120-2 of the wireless earbud 110-2 may also perform ranging against the ultra-wideband transceiver 340-2 of the client device 310-2, determining a distance 360-2 between the wireless earbud 110-2 and the client device 310-2.

In the example environment 300 of FIG. 3, by performing the ultra-wideband ranging session 200 shown in FIG. 2, the ultra-wideband transceiver 120-1 of left earbud 110-1 determines the distance 350-1 between left earbud 110-1 and client device 310-1, and the ultra-wideband transceiver 120-2 of right earbud 110-2 determines the distance 360-1 between right earbud 120-1 and client device 310-1. The ultra-wideband transceiver 120-1 of left earbud 110-1 also determines the distance 350-2 between left earbud 110-1 and client device 310-2, and the ultra-wideband transceiver 120-2 of right earbud 110-2 determines the distance 360-2 between right earbud 120-1 and client device 310-2.

In the example environment 300 of FIG. 3, because client device 310-1 and client device 310-2 are colinear, it may be the case that the range differential between the left earbud 110-1 and the right earbud 110-2 satisfies the first threshold for both the client device 310-1 and the client device 310-2. In other words, the absolute value of the difference between the distance 350-1 and 360-1 may satisfy the first threshold, and the absolute value of the difference between the distance 350-2 and 360-2 may also satisfy the first threshold. In such a case, arbitration may be performed to determine which of the colinear client devices 310-1, 310-2 is to be selected as a query target. In some implementations, this arbitration includes determining a second absolute value of a difference between a ground truth device distance and an average of the distance 350-1, 350-2 between the left earbud 110-1 and a particular client device 310-1, 310-2 and the distance 360-1, 360-2 between the right earbud 110-2 and the particular client device 310-1, 310-2. A particular client device 310-1, 310-2 is determined to be the target device in the arbitration, based on the second absolute value satisfying a second threshold. In some implementations, the ground truth device distance may be calibrated before runtime (e.g., during setup of the client devices 310-1, 310-2).

Figure 4:
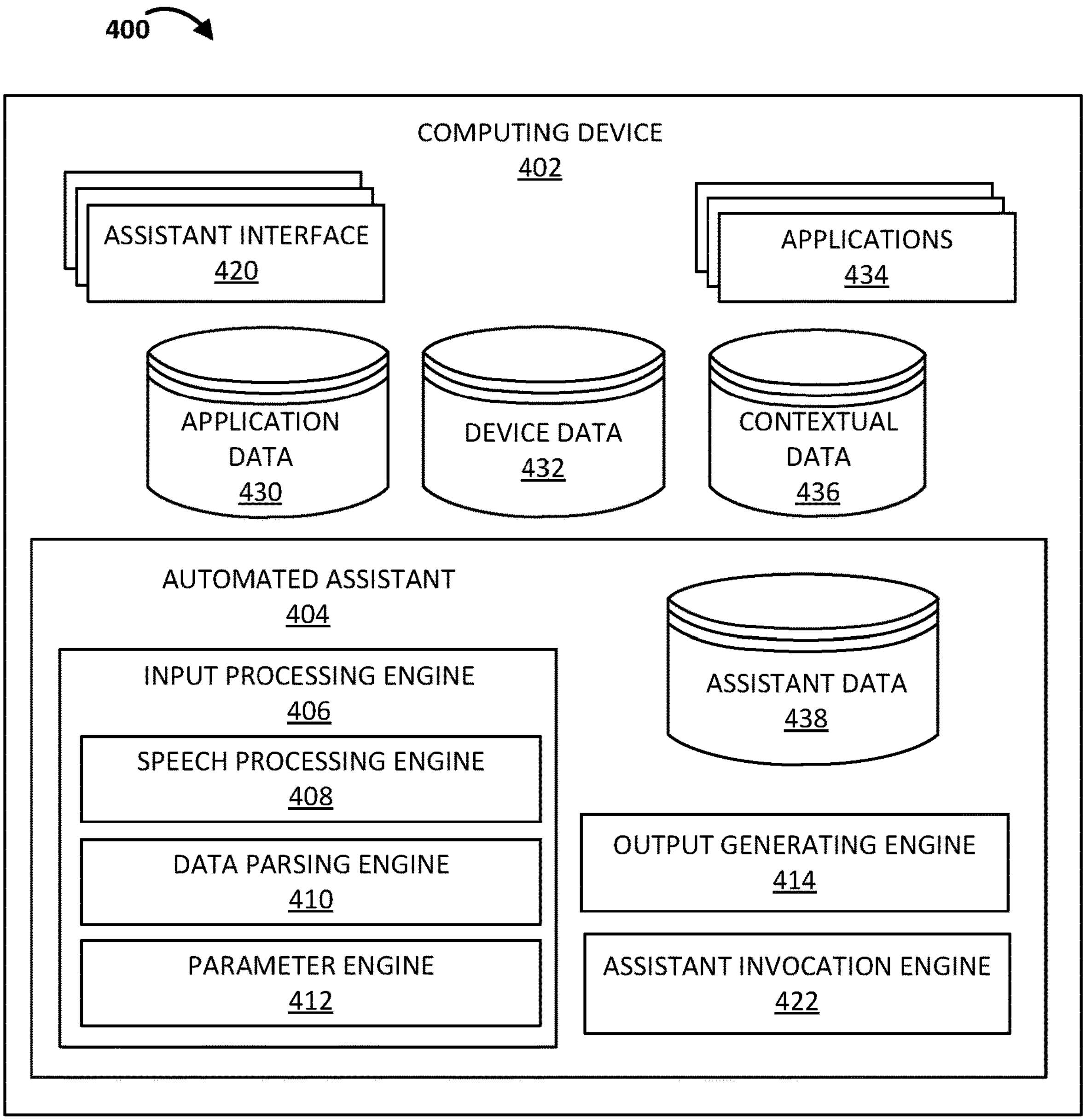
FIG. 4 schematically depicts a system that can perform multi-device arbitration using pairwise range multilateration between earbuds and a target device, in accordance with various implementations.

FIG. 4 illustrates a system 400 that can perform multi-device arbitration using pairwise range multilateration between earbuds and a target device, in accordance with various implementations. The automated assistant 404 (which may be an example of automated assistant 140-1, 140-2, . . . , 140-*n* of FIG. 1 or automated assistant 320-1, 320-2 of FIG. 3) can operate as part of an assistant application that is provided at one or more computing devices, such as a computing device 402 (which may be an example of client devices 130-1, 130-2, . . . 130-*n* of FIG. 1 and client devices 310-1, 310-2 of FIG. 2) and/or a server device. A user can interact with the automated assistant 404 via assistant interface(s) 420, which can be a microphone, a camera, a touch screen display, a user interface, and/or any other apparatus capable of providing an interface between a user and an application. For instance, a user can initialize the automated assistant 404 by providing a verbal, textual, and/or a graphical input to an assistant interface 420 to cause the automated assistant 404 to initialize one or more actions (e.g., provide data, control a peripheral device, access an agent, generate an input and/or an output, etc.). Alternatively, the automated assistant 404 can be initialized based on processing of contextual data 436 using one or more trained machine learning models. The contextual data 436 can characterize one or more features of an environment in which the automated assistant 404 is accessible, and/or one or more features of a user that is predicted to be intending to interact with the automated assistant 404. The computing device 402 can include a display device, which can be a display panel that includes a touch interface for receiving touch inputs and/or gestures for allowing a user to control applications 434 of the computing device 402 via the touch interface. In some implementations, the computing device 402 can lack a display device, thereby providing an audible user interface output, without providing a graphical user interface output. Furthermore, the computing device 402 can provide a user interface, such as a microphone, for receiving spoken natural language inputs from a user. In some implementations, the computing device 402 can include a touch interface and can be void of a camera, but can optionally include one or more other sensors.

The computing device 402 and/or other third party client devices can be in communication with a server device over a network, such as the internet. Additionally, the computing device 402 and any other computing devices can be in communication with each other over a local area network (LAN), such as a Wi-Fi network. The computing device 402 can offload computational tasks to the server device in order to conserve computational resources at the computing device 402. For instance, the server device can host the automated assistant 404, and/or computing device 402 can transmit inputs received at one or more assistant interfaces 420 to the server device. However, in some implementations, the automated assistant 404 can be hosted at the computing device 402, and various processes that can be associated with automated assistant operations can be performed at the computing device 402.

In various implementations, all or less than all aspects of the automated assistant 404 can be implemented on the computing device 402. In some of those implementations, aspects of the automated assistant 404 are implemented via the computing device 402 and can interface with a server device, which can implement other aspects of the automated assistant 404. The server device can optionally serve a plurality of users and their associated assistant applications via multiple threads. In implementations where all or less than all aspects of the automated assistant 404 are implemented via computing device 402, the automated assistant 404 can be an application that is separate from an operating system of the computing device 402 (e.g., installed "on top" of the operating system)—or can alternatively be implemented directly by the operating system of the computing device 402 (e.g., considered an application of, but integral with, the operating system).

In some implementations, the automated assistant 404 can include an input processing engine 406, which can employ multiple different modules for processing inputs and/or outputs for the computing device 402 and/or a server device. For instance, the input processing engine 406 can include a speech processing engine 408, which can process audio data received at an assistant interface 420 to identify the text embodied in the audio data. The audio data can be transmitted from, for example, the computing device 402 to the server device in order to preserve computational resources at the computing device 402. Additionally, or alternatively, the audio data can be exclusively processed at the computing device 402.

The process for converting the audio data to text can include a speech recognition algorithm, which can employ neural networks, and/or statistical models for identifying groups of audio data corresponding to words or phrases. The text converted from the audio data can be parsed by a data parsing engine 410 and made available to the automated assistant 404 as textual data that can be used to generate and/or identify command phrase(s), intent(s), action(s), slot value(s), and/or any other content specified by the user. In some implementations, output data provided by the data parsing engine 410 can be provided to a parameter engine 412 to determine whether the user provided an input that corresponds to a particular intent, action, and/or routine capable of being performed by the automated assistant 404 and/or an application or agent that is capable of being accessed via the automated assistant 404. For example, assistant data 438 can be stored at the server device and/or the computing device 402, and can include data that defines one or more actions capable of being performed by the automated assistant 404, as well as parameters necessary to perform the actions. The parameter engine 412 can generate one or more parameters for an intent, action, and/or slot value, and provide the one or more parameters to an output generating engine 414. The output generating engine 414 can use the one or more parameters to communicate with an assistant interface 420 for providing an output to a user, and/or communicate with one or more applications 434 for providing an output to one or more applications 434.

In some implementations, the automated assistant 404 can be an application that can be installed "on-top of" an operating system of the computing device 402 and/or can itself form part of (or the entirety of) the operating system of the computing device 402. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 402. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 402 can include one or more applications 434 which can be provided by a third-party entity that is different from an entity that provided the computing device 402 and/or the automated assistant 404. An application state engine of the automated assistant 404 and/or the computing device 402 can access application data 430 to determine one or more actions capable of being performed by one or more applications 434, as well as a state of each application of the one or more applications 434 and/or a state of a respective device that is associated with the computing device 402. A device state engine of the automated assistant 404 and/or the computing device 402 can access device data 432 to determine one or more actions capable of being performed by the computing device 402 and/or one or more devices that are associated with the computing device 402. Furthermore, the application data 430 and/or any other data (e.g., device data 432) can be accessed by the automated assistant 404 to generate contextual data 436, which can characterize a context in which a particular application 434 and/or device is executing, and/or a context in which a particular user is accessing the computing device 402, accessing an application 434, and/or any other device or module.

While one or more applications 434 are executing at the computing device 402, the device data 432 can characterize a current operating state of each application 434 executing at the computing device 402. Furthermore, the application data 430 can characterize one or more features of an executing application 434, such as content of one or more graphical user interfaces being rendered at the direction of one or more applications 434. Alternatively, or additionally, the application data 430 can characterize an action schema, which can be updated by a respective application and/or by the automated assistant 404, based on a current operating status of the respective application. Alternatively, or additionally, one or more action schemas for one or more applications 434 can remain static, but can be accessed by the application state engine in order to determine a suitable action to initialize via the automated assistant 404.

The computing device 402 can further include an assistant invocation engine 422 that can use one or more trained machine learning models to process application data 430, device data 432, contextual data 436, and/or any other data that is accessible to the computing device 402. The assistant invocation engine 422 can process this data in order to determine whether or not to wait for a user to explicitly speak an invocation phrase to invoke the automated assistant 404, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 422 can cause the automated assistant 404 to detect, or limit detecting, spoken invocation phrases from a user based on features of a context and/or an environment.

Figure 5:
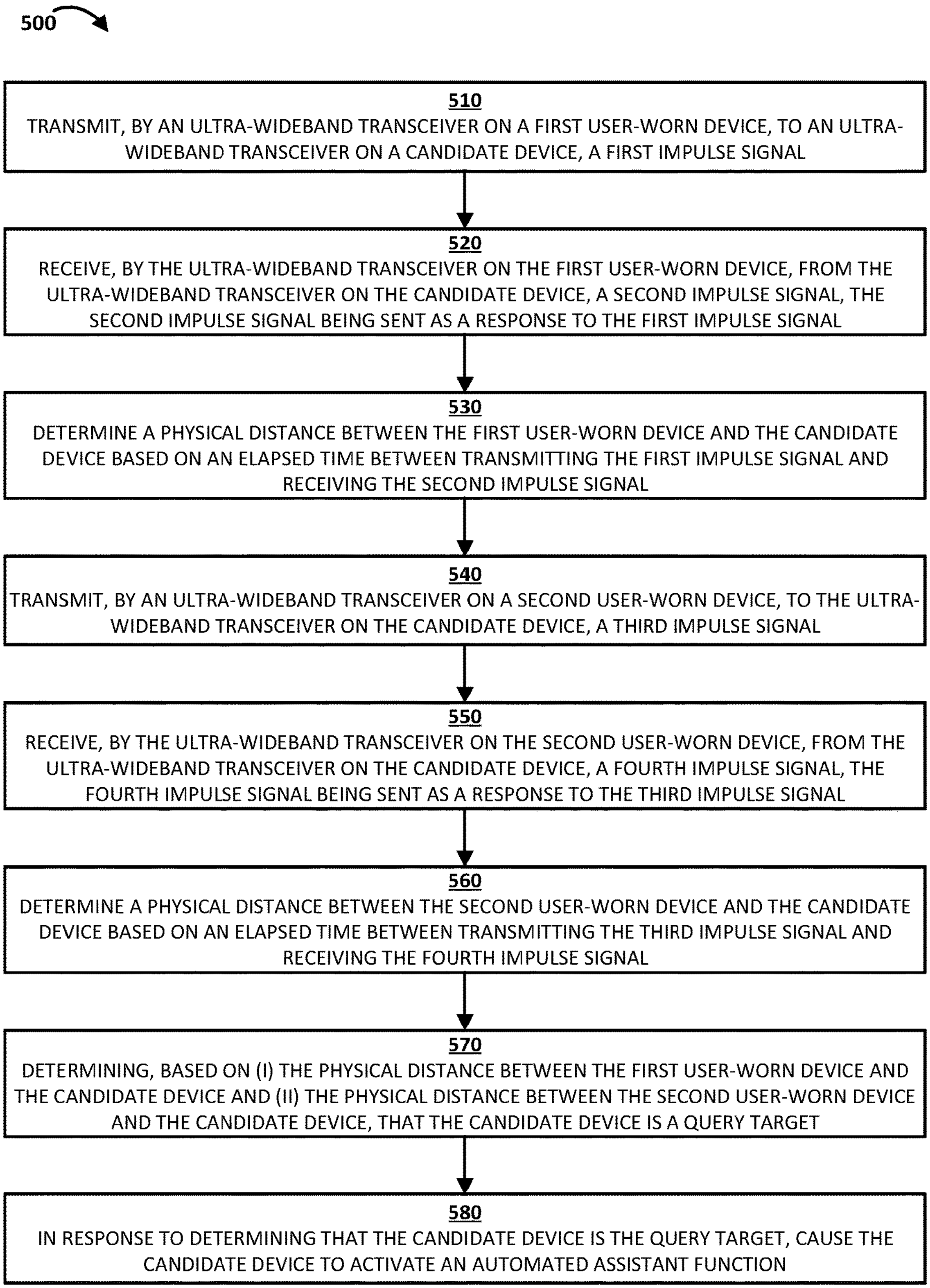
FIG. 5 depicts a flowchart illustrating an example method of performing multi-device arbitration using pairwise range multilateration between earbuds and a target device, in accordance with various implementations.

FIG. 5 depicts a flowchart illustrating an example method 500 of performing multi-device arbitration using pairwise range multilateration between earbuds and a target device. For convenience, the operations of the method 500 are described with reference to a system that performs the operations. This system of method 500 includes one or more processors and/or other component(s) of a client device. Moreover, while operations of the method 500 are shown in a particular order, this is not meant to be limiting. One or more operations may be reordered, omitted, or added.

At block 510, the system transmits, by an ultra-wideband transceiver (e.g., ultra-wideband transceiver 120-1) on a first user-worn device (e.g., wireless earbud 110-1), to an ultra-wideband transceiver (e.g., ultra-wideband transceiver 160-1, 160-2, . . . , **160-*n*) on a candidate device (e.g., one of the client devices 130-1, 130-2, . . . , 130-*n*), a first impulse signal. In some implementations, the first user-worn device is a first earbud (e.g., wireless earbud 110-1**).

At block 520, the system receives, by the ultra-wideband transceiver (e.g., ultra-wideband transceiver 120-1) on the first user-worn device (e.g., wireless earbud 110-1), from the ultra-wideband transceiver (e.g., ultra-wideband transceiver 160-1, 160-2, . . . , **160-*n*) on the candidate device (e.g., one of the client devices 130-1, 130-2, . . . , 130-*n***), a second impulse signal, the second impulse signal being sent as a response to the first impulse signal.

At block 530, the system determines a physical distance between the first user-worn device (e.g., wireless earbud 110-1) and the candidate device (e.g., one of the client devices 130-1, 130-2, . . . , **130-*n*) based on an elapsed time between transmitting the first impulse signal and receiving the second impulse signal. In some implementations, determining the physical distance between the first user-worn device (e.g., wireless earbud 110-1) and the candidate device (e.g., one of the client devices 130-1, 130-2, . . . , 130-*n***) is further based on a predetermined time in which the candidate device prepares the response to the first impulse signal.

At block 540, the system transmits, by an ultra-wideband transceiver (e.g., ultra-wideband transceiver 120-2) on a second user-worn device (e.g., wireless earbud 110-2), to the ultra-wideband transceiver (e.g., ultra-wideband transceiver 160-1, 160-2, . . . , **160-*n*) on the candidate device (e.g., one of the client devices 130-1, 130-2, . . . , 130-*n*), a third impulse signal. In some implementations, the second user-worn device is a second earbud (e.g., wireless earbud 110-2**).

At block 550, the system receives, by the ultra-wideband transceiver (e.g., ultra-wideband transceiver 120-2) on the second user-worn device (e.g., wireless earbud 110-2), from the ultra-wideband transceiver (e.g., ultra-wideband transceiver 160-1, 160-2, . . . , **160-*n*) on the candidate device (e.g., one of the client devices 130-1, 130-2, . . . , 130-*n***), a fourth impulse signal, the fourth impulse signal being sent as a response to the third impulse signal.

At block 560, the system determines a physical distance between the second user-worn device (e.g., wireless earbud 110-2) and the candidate device (e.g., one of the client devices 130-1, 130-2, . . . , **130-*n*) based on an elapsed time between transmitting the third impulse signal and receiving the fourth impulse signal. In some implementations, determining the physical distance between the second user-worn device (e.g., wireless earbud 110-2) and the candidate device (e.g., one of the client devices 130-1, 130-2, . . . , 130-*n***) is further based on a predetermined time in which the candidate device prepares the response to the second impulse signal.

At block 570, the system determines, based on (i) the physical distance between the first user-worn device (e.g., wireless earbud 110-1) and the candidate device (e.g., one of the client devices 130-1, 130-2, . . . , **130-*n*) and (ii) the physical distance between the second user-worn device (e.g., wireless earbud 110-2) and the candidate device (e.g., one of the client devices 130-1, 130-2, . . . , 130-*n***), that the candidate device is a query target. In some implementations, determining that the candidate device is the query target includes: determining a first absolute value, the first absolute value being an absolute value of a difference between (i) the physical distance between the first user-worn device and the candidate device and (ii) the physical distance between the second user-worn device and the candidate device; and determining that the first absolute value satisfies a first threshold.

In some implementations, determining that the candidate device is the query target at block 570 further includes: determining a second absolute value, the second absolute value being an absolute value of a difference between a ground truth device distance and an average of (i) the physical distance between the first user-worn device and the candidate device and (ii) the physical distance between the second user-worn device and the candidate device; and determining that the second absolute value satisfies a second threshold.

At block 580, in response to determining that the candidate device (e.g., one of the client devices 130-1, 130-2, . . . , **130-*n*) is the query target, the system causes the candidate device to activate an automated assistant function. In some implementations, at block 580**, the system causes the candidate device to perform automated speech recognition on an input audio signal, prior to identifying a hotword in the input audio signal.

Figure 6:
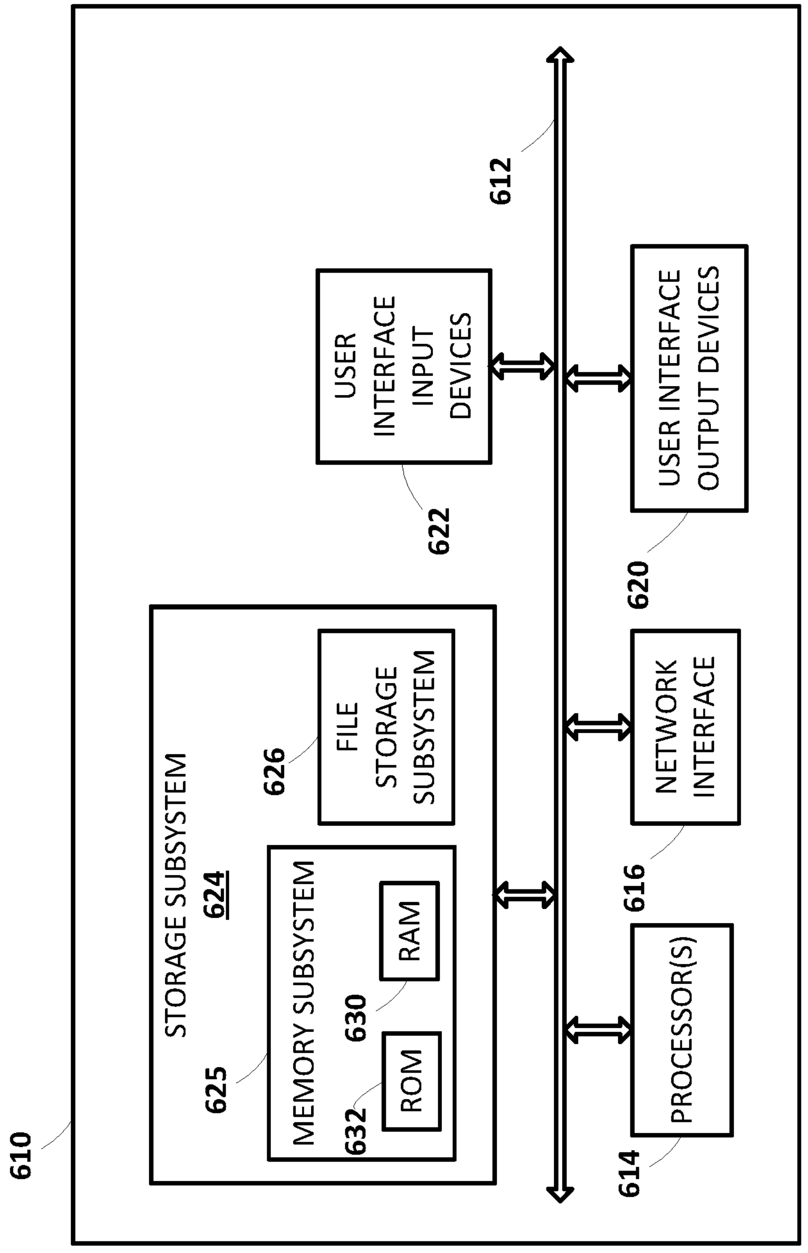
FIG. 6 depicts an example architecture of a computing device.

FIG. 6 is a block diagram of an example computing device 610 that may optionally be utilized to perform one or more aspects of techniques described herein. In some implementations, one or more of a client device, cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term “input device” is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIGS. 1, 3, and 4.

These software modules are generally executed by processor 614 alone or in combination with other processors. The memory subsystem 625 included in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:

transmitting, by an ultra-wideband transceiver on a first user-worn device, to an ultra-wideband transceiver on a candidate device, a first impulse signal;

receiving, by the ultra-wideband transceiver on the first user-worn device, from the ultra-wideband transceiver on the candidate device, a second impulse signal, the second impulse signal being sent as a response to the first impulse signal;

determining a physical distance between the first user-worn device and the candidate device based on an elapsed time between transmitting the first impulse signal and receiving the second impulse signal;

transmitting, by an ultra-wideband transceiver on a second user-worn device, to the ultra-wideband transceiver on the candidate device, a third impulse signal;

receiving, by the ultra-wideband transceiver on the second user-worn device, from the ultra-wideband transceiver on the candidate device, a fourth impulse signal, the fourth impulse signal being sent as a response to the third impulse signal;

determining a physical distance between the second user-worn device and the candidate device based on an elapsed time between transmitting the third impulse signal and receiving the fourth impulse signal;

determining a first absolute value, the first absolute value being an absolute value of a difference between (i) the physical distance between the first user-worn device and the candidate device and (ii) the physical distance between the second user-worn device and the candidate device;

determining a second absolute value, the second absolute value being an absolute value of a difference between a previously calibrated ground truth distance to the candidate device and an average of (i) the physical distance between the first user-worn device and the candidate device and (ii) the physical distance between the second user-worn device and the candidate device; and determining, based on the first absolute value satisfying a first threshold and the second absolute value satisfying a second threshold, that the candidate device is a query target.

2. The method according to claim 1, wherein the first user-worn device is a first earbud, and the second user-worn device is a second earbud.

3. The method according to claim 1, wherein:

determining the physical distance between the first user-worn device and the candidate device is further based on a predetermined time in which the candidate device prepares the response to the first impulse signal; and determining the physical distance between the second user-worn device and the candidate device is further based on a predetermined time in which the candidate device prepares the response to the third impulse signal.

4. The method according to claim 1, further comprising, in response to determining that the candidate device is the query target, causing the candidate device to activate an automated assistant function.

5. The method according to claim 4, further comprising causing the candidate device to perform automated speech recognition on an input audio signal, prior to identifying a hotword in the input audio signal.

6. The method according to claim 1, wherein the previously calibrated ground truth distance to the candidate device is calibrated during setup of the candidate device.

7. A computer program product comprising one or more non-transitory computer-readable storage media having program instructions collectively stored on the one or more non-transitory computer-readable storage media, the program instructions executable to:

transmit, by an ultra-wideband transceiver on a first user-worn device, to an ultra-wideband transceiver on a candidate device, a first impulse signal;

receive, by the ultra-wideband transceiver on the first user-worn device, from the ultra-wideband transceiver on the candidate device, a second impulse signal, the second impulse signal being sent as a response to the first impulse signal;

determine a physical distance between the first user-worn device and the candidate device based on an elapsed time between transmitting the first impulse signal and receiving the second impulse signal;

transmit, by an ultra-wideband transceiver on a second user-worn device, to the ultra-wideband transceiver on the candidate device, a third impulse signal;

receive, by the ultra-wideband transceiver on the second user-worn device, from the ultra-wideband transceiver on the candidate device, a fourth impulse signal, the fourth impulse signal being sent as a response to the third impulse signal;

determine a physical distance between the second user-worn device and the candidate device based on an elapsed time between transmitting the third impulse signal and receiving the fourth impulse signal;

determine a first absolute value, the first absolute value being an absolute value of a difference between (i) the physical distance between the first user-worn device and the candidate device and (ii) the physical distance between the second user-worn device and the candidate device;

determine a second absolute value, the second absolute value being an absolute value of a difference between a previously calibrated ground truth distance to the candidate device and an average of (i) the physical distance between the first user-worn device and the candidate device and (ii) the physical distance between the second user-worn device and the candidate device; and determine, based on the first absolute value satisfying a first threshold and the second absolute value satisfying a second threshold second user-worn device and the candidate device, that the candidate device is a query target.

8. The computer program product according to claim 7, wherein the first user-worn device is a first earbud, and the second user-worn device is a second earbud.

9. The computer program product according to claim 7, wherein:

determining the physical distance between the first user-worn device and the candidate device is further based on a predetermined time in which the candidate device prepares the response to the first impulse signal; and determining the physical distance between the second user-worn device and the candidate device is further based on a predetermined time in which the candidate device prepares the response to the third impulse signal.

10. The computer program product according to claim 7, wherein the program instructions are further executable to, in response to determining that the candidate device is the query target, cause the candidate device to activate an automated assistant function.

11. The computer program product according to claim 10, wherein the program instructions are further executable to cause the candidate device to perform automated speech recognition on an input audio signal, prior to identifying a hotword in the input audio signal.

12. A system comprising:

a processor, a computer-readable memory, one or more computer-readable storage media, and program instructions collectively stored on the one or more computer-readable storage media, the program instructions executable to:

transmit, by an ultra-wideband transceiver on a first user-worn device, to an ultra-wideband transceiver on a candidate device, a first impulse signal;

receive, by the ultra-wideband transceiver on the first user-worn device, from the ultra-wideband transceiver on the candidate device, a second impulse signal, the second impulse signal being sent as a response to the first impulse signal;

determine a physical distance between the first user-worn device and the candidate device based on an elapsed time between transmitting the first impulse signal and receiving the second impulse signal;

transmit, by an ultra-wideband transceiver on a second user-worn device, to the ultra-wideband transceiver on the candidate device, a third impulse signal;

receive, by the ultra-wideband transceiver on the second user-worn device, from the ultra-wideband transceiver on the candidate device, a fourth impulse signal, the fourth impulse signal being sent as a response to the third impulse signal;

determine a physical distance between the second user-worn device and the candidate device based on an elapsed time between transmitting the third impulse signal and receiving the fourth impulse signal;

determine a first absolute value, the first absolute value being an absolute value of a difference between (i) the physical distance between the first user-worn device and the candidate device and (ii) the physical distance between the second user-worn device and the candidate device;

determine a second absolute value, the second absolute value being an absolute value of a difference between a previously calibrated ground truth distance to the candidate device and an average of (i) the physical distance between the first user-worn device and the candidate device and (ii) the physical distance between the second user-worn device and the candidate device; and determine, based on the first absolute value satisfying a first threshold and the second absolute value satisfying a second threshold, that the candidate device is a query target.

13. The system according to claim 12, wherein the first user-worn device is a first earbud, and the second user-worn device is a second earbud.

14. The system according to claim 12, wherein:

determining the physical distance between the first user-worn device and the candidate device is further based on a predetermined time in which the candidate device prepares the response to the first impulse signal; and determining the physical distance between the second user-worn device and the candidate device is further based on a predetermined time in which the candidate device prepares the response to the third impulse signal.

15. The system according to claim 12, wherein the program instructions are further executable to, in response to determining that the candidate device is the query target, cause the candidate device to activate an automated assistant function.

* * * * *